(12) United States Patent
Elias et al.

(10) Patent No.: US 11,908,448 B2
(45) Date of Patent: Feb. 20, 2024

(54) PARALLEL TACOTRON NON-AUTOREGRESSIVE AND CONTROLLABLE TTS

(71) Applicant: Google LLC, Mountain View, CA (US)

(72) Inventors: Isaac Elias, Mountain View, CA (US); Jonathan Shen, Mountain View, CA (US); Yu Zhang, Mountain View, CA (US); Ye Jia, Mountain View, CA (US); Ron J. Weiss, New York, NY (US); Yonghui Wu, Fremont, CA (US); Byungha Chun, Tokyo (JP)

(73) Assignee: Google LLC, Mountain View, CA (US)

( * ) Notice: Subject to any disclaimer, the term of this patent is extended or adjusted under 35 U.S.C. 154(b) by 238 days.

(21) Appl. No.: 17/327,076

(22) Filed: May 21, 2021

(65) Prior Publication Data

US 2022/0122582 A1 Apr. 21, 2022

Related U.S. Application Data

(60) Provisional application No. 63/094,834, filed on Oct. 21, 2020.

(51) Int. Cl.
*G10L 13/08* (2013.01)
*G10L 13/047* (2013.01)
(Continued)

(52) U.S. Cl.
CPC .......... *G10L 13/08* (2013.01); *G06F 40/126* (2020.01); *G06N 3/044* (2023.01); *G06N 3/045* (2023.01);
(Continued)

(58) Field of Classification Search
None
See application file for complete search history.

(56) References Cited

U.S. PATENT DOCUMENTS

2018/0336880 A1* 11/2018 Arik ................... G10L 25/30
2019/0251952 A1* 8/2019 Arik ................... G10L 13/08
(Continued)

FOREIGN PATENT DOCUMENTS

WO WO-2021101665 A1 * 5/2021 ............... G10H 1/06

OTHER PUBLICATIONS

Guangzhi Sun, Yu Zhang, Ron J. Weiss, Yuan Cao, Heiga Zen, Andrew Rosenberg, Bhuvana Ramabhadran, Yonghui Wu; Generating Diverse And Natural Text-To-Speech Samples Using A Quantized Fine-Grained Vae And Autoregressive Prosody Prior Date: Feb. 6, 2020 URL:https://arxiv.org/pdf/2002.03788.pdf (Year: 2020).*

(Continued)

*Primary Examiner* — Richa Sonifrank
(74) *Attorney, Agent, or Firm* — Honigman LLP; Brett A. Krueger; Grant Griffith

(57) ABSTRACT

A method for training a non-autoregressive TTS model includes receiving training data that includes a reference audio signal and a corresponding input text sequence. The method also includes encoding the reference audio signal into a variational embedding that disentangles the style/prosody information from the reference audio signal and encoding the input text sequence into an encoded text sequence. The method also includes predicting a phoneme duration for each phoneme in the input text sequence and determining a phoneme duration loss based on the predicted phoneme durations and a reference phoneme duration. The method also includes generating one or more predicted mel-frequency spectrogram sequences for the input text sequence and determining a final spectrogram loss based on the predicted mel-frequency spectrogram sequences and a reference mel-frequency spectrogram sequence. The method also includes training the TTS model based on the final (Continued)

spectrogram loss and the corresponding phoneme duration loss.

22 Claims, 8 Drawing Sheets

(51) Int. Cl.
| | |
|---|---|
| *G06F 40/126* | (2020.01) |
| *G10L 21/10* | (2013.01) |
| *G06N 3/08* | (2023.01) |
| *G06N 3/088* | (2023.01) |
| *G06N 3/044* | (2023.01) |
| *G06N 3/045* | (2023.01) |
| *G06N 3/048* | (2023.01) |

(52) U.S. Cl.
CPC ............... *G06N 3/08* (2013.01); *G06N 3/088* (2013.01); *G10L 13/047* (2013.01); *G10L 21/10* (2013.01); *G06N 3/048* (2023.01)

(56) References Cited

U.S. PATENT DOCUMENTS

2020/0074985 A1  3/2020  Clark et al.
2021/0375259 A1* 12/2021  Lu ........................... G10L 13/00

OTHER PUBLICATIONS

Jonathan Shen, Ye Jia, Mike Chrzanowski ; Non-Attentive Tacotron: Robust And Controllable Neural Tts Synthesis Including Unsupervised Duration Modeling Date: Oct. 8, 2020; URL: https://arxiv.org/pdf/2010.04301v1.pdf (Year: 2020).*
Zhebin Zhang; Sai Wu; Gang Chen; Dawei Jiang; Self-Attention and Dynamic Convolution Hybrid Model for Neural Machine Translation; Aug. 8, 2020; URL: https://ieeexplore.ieee.org/document/9194516/authors#authors (Year: 2020).*
Jonathan Shen, Ruoming Pang , Ron J.Weiss, Mike Schuster, Navdeep Jaitly, Zongheng Yang, Zhifeng Chen, Yu Zhang, Yuxuan Wang, RJ..-Ryan , Rif..Saurous , Yannis.., Yonghui Wu; Natural TTS Synthesis by Conditioning Wavenet on MEL Spectrogram Predictions; URL:https://arxiv.org/pdf/1712.05884.pdf (Year: 2018).*
Bidiectional Variational Inference for Non-Autoregressive Text-to-Speech, Lee at al. 2021.
Non-Autogressive Neural Text-to-Speech, Peng et al. Jun. 29, 2020.
FastSpeech 2: Fast and High-Quality End-to-End Text to Speech, Ren et al., Mar. 4, 2021.
Learning to Speak Fluently in a Foreign Language: Multilingual Speech Synthesin and Cross-Language Voice Cloning, Zhang et al, Jul. 24, 2019.
International Search Report and Written Opinion for the related Application No. PCT/US2021/030804, dated Aug. 18, 2021, 104 pages.
Shen Jonathan et al: "Non-Attentive Tacotron: Robust and Controllable Neural TTS Synthesis Including Unsupervised Duration Modeling", Oct. 8, 2020 (Oct. 8, 2020), pp. 1-13, XP055829270, Retrieved from the Internet: <URL:https://arxiv.org/pdf/2010.04301vl. pdf> [retrieved on Jul. 30, 2021] abstract; figure 1, Sections 2-4.
Yi Ren et al: "FastSpeech 2: Fast and High-Quality End-to-End Text to Speech" , arxi v.org, Corn Ell University Library, 201 Olin Library Cornell Univ Ersity Ithaca, NY 14853, Oct. 16, 2020 (Oct. 16, 2020), XP081787811, abstract p. 4.
Dan Lim et al: "JDI-T: Jointly trained Duration Informed Transformer for Text-To-Speech without Explicit Alignment", arxiv.org, Cornell University Library, 201 Olin Library Cornell University Ithaca, NY 14853, Oct. 5, 2020 (Oct. 5, 2020), XP081777277, abstract Sections 3.2 and 4.
Felix Wu et al: "Pay Less Attention with Lightweight and Dynamic Convolutions", arxiv.org, Corn Ell University Library, 201 Olin Library Cornell University Ithaca, NY 14853, Jan. 29, 2019 (Jan. 29, 2019), XP081023867, the whole document.
Aaron Van Den Oord et al: "Parallel WaveNet: Fast High-Fi del i ty Speech Synthesis", arxiv.org, Cornell University Library, 201 Olin Library Cornell University Ithaca, NY 14853, Nov. 28, 2017 (Nov. 28, 2017), XP081297859, cited i n the application the whole document.

* cited by examiner

PARALLEL TACOTRON NON-AUTOREGRESSIVE AND CONTROLLABLE TTS

CROSS REFERENCE TO RELATED APPLICATIONS

This U.S. patent application claims priority under 35 U.S.C. § 119(e) to U.S. Provisional Application 63/094,834, filed on Oct. 21, 2020. The disclosure of this prior application is considered part of the disclosure of this application and is hereby incorporated by reference in its entirety.

TECHNICAL FIELD

This disclosure relates to parallel tacotron non-autoregressive and controllable text-to-speech (TTS).

BACKGROUND

Text-to-speech (TTS) systems read aloud digital text to a user and are becoming increasingly popular on mobile devices. Certain TTS models aim to synthesize various aspects of speech, such as speaking styles, to produce human-like, natural sounding speech. Synthesis in TTS models is a one-to-many mapping problem, as there can be multiple possible speech outputs for the different prosodies of text inputs. Many TTS systems utilize an autoregressive model that predicts current values based on previous values. While autoregressive TTS models can synthesize text and generate highly natural speech outputs, the hundreds of calculations required reduce efficiency during inference.

SUMMARY

One aspect of the disclosure provides a computer-implemented method that when executed on data processing hardware causes the data processing hardware to perform operations for training a non-autoregressive text-to-speech (TTS) model. The operations include receiving training data that includes a reference audio signal and a corresponding input text sequence. The reference audio signal includes a spoken utterance and the input text sequence corresponds to a transcript for the reference audio signal. The operations also include encoding, using a residual encoder, the reference audio signal into a variational embedding that disentangles the style/prosody information from the reference audio signal and encoding, using a text encoder, the input text sequence into an encoded text sequence. The operations also include predicting, using a duration decoder and based on the encoded text sequence and the variational embedding, a phoneme duration for each phoneme in the input text sequence. The operations also include determining a phoneme duration loss based on the predicted phoneme durations and a reference phoneme duration from the reference audio signal for each phoneme in the input text sequence. The operations also include generating, as output from a spectrogram decoder that includes a stack of self-attention blocks and based on an output for the duration decoder, one or more predicted mel-frequency spectrogram sequences for the input text sequence. The operations also include determining a final spectrogram loss based on the one or more predicted mel-frequency spectrogram sequences and a reference mel-frequency spectrogram sequence sampled from the reference audio signal and training the TTS model based on the final spectrogram loss and the corresponding phoneme duration loss determined for each phoneme in the input text sequence.

Implementations of the disclosure may include one or more of the following optional features. In some implementations, each self-attention block in the stack of self-attention blocks includes an identical lightweight convolution (LConv) block. In other implementations, each self-attention block in the stack of self-attention blocks includes an identical transformer block. The input text sequence may include words that each have one or more phonemes, silences at all word boundaries, and punctuation marks.

In some examples, the residual encoder includes a global variational autoencoder (VAE) and encoding the reference audio signal into the variational embedding includes: sampling the reference mel-frequency spectrogram sequence from the reference audio signal; and encoding, using the global VAE, the reference mel-frequency spectrogram sequence into the variational embedding. In some implementations, the residual encoder includes a phoneme-level fine-grained variational autoencoder (VAE) and encoding the reference audio signal into the variational embedding includes: sampling the reference mel-frequency spectrogram sequence from the reference audio signal; aligning the reference mel-frequency spectrogram sequence with each phoneme in a sequence of phonemes extracted from the input text sequence; and encoding, using the phoneme-level fine-grained VAE, based on aligning the reference mel-frequency spectrogram sequence with each phoneme in the sequence of phonemes, a sequence of phoneme-level variational embeddings.

Optionally, the residual encoder may include a stack of lightweight convolution (LConv) blocks where each LConv block in the stack of LConv blocks includes a gated linear unit (GLU) layer, a LConv layer configured to receive an output of the GLU layer, a residual connection configured to concatenate an output of the LConv layer with an input to the GLU layer, and a final feedforward layer configured to receive, as input, the residual connection concatenating the output of the LConv layer with the input to the GLU layer. The operations may further include upsampling, using the reference phoneme duration sampled from the reference audio signal for each phoneme in the input text sequence, the output of the duration decoder into a number of frames and obtaining positional embedding that represent phoneme position information for each phoneme in the input text utterance. Here, generating the one or more predicted mel-frequency spectrogram sequences for the input text sequence is based on the positional embeddings and the upsampling of the output of the duration decoder into the number of frames.

In some examples, generating the one or more predicted mel-frequency spectrogram sequences for the input text sequence includes generating, as output from each self-attention block in the stack of self-attention blocks of the spectrogram decoder, a respective mel-frequency spectrogram sequence. In these examples, determining the final spectrogram loss includes, for each respective predicted mel-frequency spectrogram sequence, determining a respective spectrogram loss based on the predicted mel-frequency spectrogram sequence and the reference mel-frequency spectrogram sequence and aggregating the respective spectrogram losses determined for the predicted mel-frequency spectrogram sequences to generate the final spectrogram loss. In some implementations, the duration decoder includes a stack of self-attention blocks followed by two independent projections and predicting the phoneme duration for each phoneme in the input text sequence includes:

predicting, using a sigmoid activation following a first one of the two independent projections, a probability of non-zero duration for each phoneme; and predicting, using a softplus activation following a second one of the two independent projections, the phoneme duration for each phoneme. The operations may further include, at each phoneme determining whether the probability of non-zero duration predicted for the corresponding phoneme is less than a threshold value and when the probability of non-zero duration is less than the threshold value, zeroing out the phoneme duration predicted for the corresponding phoneme.

In some examples, the operations further include concatenating the encoding text sequence, the variational embedding, and a reference speaker embedding that represents an identify of a reference speaker that uttered the reference audio signal and generating the output of the duration decoder based on the duration decoder receiving, as input, the concatenation of the encoded text sequence, the variational embedding, and the reference speaker embedding. Optionally, the input text sequence may include a sequence of phonemes and encoding the input text sequence into the encoded text sequence includes: receiving, from a phoneme look-up table, a respective embedding of each phoneme in the sequence of phonemes; for each phoneme in the sequence of phonemes, processing, using an encoder pre-net neural network of the text encoder, the respective embedding to generate a respective transformed embedding of the phoneme; processing, using a bank of convolutional blocks, the respective transformed embeddings to generate convolution outputs; and processing, using a stack of self-attention blocks, the convolution outputs to generate the encoded text sequence.

Another aspect of the disclosure provides a system for training a non-autoregressive text-to-speech (TTS) model that includes data processing hardware and memory hardware storing instructions that when executed on the data processing hardware cause the data processing hardware to perform operations. The operations include receiving training data that includes a reference audio signal and a corresponding input text sequence. The reference audio signal includes a spoken utterance and the input text sequence corresponds to a transcript for the reference audio signal. The operations also include encoding, using a residual encoder, the reference audio signal into a variational embedding that disentangles the style/prosody information from the reference audio signal and encoding, using a text encoder, the input text sequence into an encoded text sequence. The operations also include predicting, using a duration decoder and based on the encoded text sequence and the variational embedding, a phoneme duration for each phoneme in the input text sequence. The operations also include determining a phoneme duration loss based on the predicted phoneme durations and a reference phoneme duration from the reference audio signal for each phoneme in the input text sequence. The operations also include generating, as output from a spectrogram decoder that includes a stack of self-attention blocks and based on an output for the duration decoder, one or more predicted mel-frequency spectrogram sequences for the input text sequence. The operations also include determining a final spectrogram loss based on the one or more predicted mel-frequency spectrogram sequences and a reference mel-frequency spectrogram sequence sampled from the reference audio signal and training the TTS model based on the final spectrogram loss and the corresponding phoneme duration loss determined for each phoneme in the input text sequence.

Implementations of the disclosure may include one or more of the following optional features. In some implementations, each self-attention block in the stack of self-attention blocks includes an identical lightweight convolution (LConv) block. In other implementations, each self-attention block in the stack of self-attention blocks includes an identical transformer block. The input text sequence may include words that each have one or more phonemes, silences at all word boundaries, and punctuation marks.

In some examples, the residual encoder includes a global variational autoencoder (VAE) and encoding the reference audio signal into the variational embedding includes: sampling the reference mel-frequency spectrogram sequence from the reference audio signal; and encoding, using the global VAE, the reference mel-frequency spectrogram sequence into the variational embedding. In some implementations, the residual encoder includes a phoneme-level fine-grained variational autoencoder (VAE) and encoding the reference audio signal into the variational embedding includes: sampling the reference mel-frequency spectrogram sequence from the reference audio signal; aligning the reference mel-frequency spectrogram sequence with each phoneme in a sequence of phonemes extracted from the input text sequence; and encoding, using the phoneme-level fine-grained VAE, based on aligning the reference mel-frequency spectrogram sequence with each phoneme in the sequence of phonemes, a sequence of phoneme-level variational embeddings.

Optionally, the residual encoder may include a stack of lightweight convolution (LConv) blocks where each LConv block in the stack of LConv blocks includes a gated linear unit (GLU) layer, a LConv layer configured to receive an output of the GLU layer, a residual connection configured to concatenate an output of the LConv layer with an input to the GLU layer, and a final feedforward layer configured to receive, as input, the residual connection concatenating the output of the LConv layer with the input to the GLU layer. The operations may further include upsampling, using the reference phoneme duration sampled from the reference audio signal for each phoneme in the input text sequence, the output of the duration decoder into a number of frames and obtaining positional embedding that represent phoneme position information for each phoneme in the input text utterance. Here, generating the one or more predicted mel-frequency spectrogram sequences for the input text sequence is based on the positional embeddings and the upsampling of the output of the duration decoder into the number of frames.

In some examples, generating the one or more predicted mel-frequency spectrogram sequences for the input text sequence includes generating, as output from each self-attention block in the stack of self-attention blocks of the spectrogram decoder, a respective mel-frequency spectrogram sequence. In these examples, determining the final spectrogram loss includes, for each respective predicted mel-frequency spectrogram sequence, determining a respective spectrogram loss based on the predicted mel-frequency spectrogram sequence and the reference mel-frequency spectrogram sequence and aggregating the respective spectrogram losses determined for the predicted mel-frequency spectrogram sequences to generate the final spectrogram loss. In some implementations, the duration decoder includes a stack of self-attention blocks followed by two independent projections and predicting the phoneme duration for each phoneme in the input text sequence includes: predicting, using a sigmoid activation following a first one of the two independent projections, a probability of non-zero duration for each phoneme; and predicting, using a softplus activation following a second one of the two independent projections, the phoneme duration for each phoneme. The operations may further include, at each phoneme determining whether the probability of non-zero duration predicted for the corresponding phoneme is less than a threshold value and when the probability of non-zero duration is less than the threshold value, zeroing out the phoneme duration predicted for the corresponding phoneme.

In some examples, the operations further include concatenating the encoding text sequence, the variational embedding, and a reference speaker embedding that represents an identify of a reference speaker that uttered the reference audio signal and generating the output of the duration decoder based on the duration decoder receiving, as input, the concatenation of the encoded text sequence, the variational embedding, and the reference speaker embedding. Optionally, the input text sequence may include a sequence of phonemes and encoding the input text sequence into the encoded text sequence includes: receiving, from a phoneme look-up table, a respective embedding of each phoneme in the sequence of phonemes; for each phoneme in the sequence of phonemes, processing, using an encoder pre-net neural network of the text encoder, the respective embedding to generate a respective transformed embedding of the phoneme; processing, using a bank of convolutional blocks, the respective transformed embeddings to generate convolution outputs; and processing, using a stack of self-attention blocks, the convolution outputs to generate the encoded text sequence.

Another aspect of the disclosure provides a computer-implemented method that when executed on data processing hardware causes the data processing hardware to perform operations. The operations include receiving a text utterance to be synthesized into speech and encoding, using a text encoder of a non-autoregressive TTS model, a sequence of phonemes extracted from the text utterance into an encoded text sequence. The operations also include selecting a variational embedding for the text utterance that specifies an intended prosody/style for synthesizing the text utterance into speech. For each phoneme in the sequence of phonemes, the operations further include predicting, using a duration decoder of the non-autoregressive TTS model, a phoneme duration for the corresponding phoneme based on the encoded text sequence and the selected variational embedding. The operations also include generating, as output from a spectrogram decoder of the non-autoregressive TTS model that includes a stack of self-attention blocks and based on an output of the duration decoder and the predicted phoneme durations, a predicted mel-frequency spectrogram sequence for the text utterance. The predicted mel-frequency spectrogram sequence has the intended prosody/style specified by the selected variational embedding.

Implementations of the disclosure may include one or more of the following optional features. In some implementations, the selected variational embedding includes a prior variational embedding sampled from a variational autoencoder (VAE)-based residual encoder. The operations may further include converting, using a synthesizer, the predicted mel-frequency spectrogram sequence into synthesized speech. In some examples, the sequence of phonemes extracted from the text utterance into the encoded text sequence includes: receiving, from a phoneme look-up table, a respective embedding of each phoneme in the sequence of phonemes; for each phoneme in the sequence of phonemes, processing, using an encoder pre-net neural network of the text encoder, the respective embedding to generate a respective transformed embedding of the phoneme; processing, using a bank of convolutional blocks, the respective transformed embedding to generate convolution outputs; and processing, using a stack of self-attention blocks, the convolution outputs to generate the encoded text sequence.

Optionally, each self-attention block in the stack of self-attention blocks of the spectrogram decoder may include one of an identical lightweight convolution (LConv) block or an identical transformer block. In some implementations, the operations further include upsampling, using the predicted phoneme durations, the output of the duration decoder into a number of frames and obtaining positional embedding that represent phoneme position information for each phoneme in the sequence of phonemes. Here, generating the predicted mel-frequency spectrogram sequence for the text utterance is based on the positional embedding and the upsampling of the output of the duration decoder into the number of frames. The operations may further include concatenating the encoded text sequence, the selected variational embedding, and a reference speaker embedding that represents an identify of a reference speaker associated with the selected variational embedding and generating the output of the duration decoder based on the duration decoder receiving, as input, the concatenation of the encoded text sequence, the variational embedding, and the reference speaker embedding.

Another aspect of the disclosure provides a system for executing a trained non-autoregressive text-to-speech (TTS) model that includes data processing hardware and memory hardware storing instructions that when executed on the data processing hardware cause the data processing hardware to perform operations. The operations include receiving a text utterance to be synthesized into speech and encoding, using a text encoder of a non-autoregressive TTS model, a sequence of phonemes extracted from the text utterance into an encoded text sequence. The operations also include selecting a variational embedding for the text utterance that specifies an intended prosody/style for synthesizing the text utterance into speech. For each phoneme in the sequence of phonemes, the operations further include predicting, using a duration decoder of the non-autoregressive TTS model, a phone duration for the corresponding phoneme based on the encoded text sequence and the selected variational embedding. The operations also include generating, as output from a spectrogram decoder of the non-autoregressive TTS model that includes a stack of self-attention blocks and based on an output of the duration decoder and the predicted phoneme durations, a predicted mel-frequency spectrogram sequence for the text utterance. The predicted mel-frequency spectrogram sequence has the intended prosody/style specified by the selected variational embedding.

Implementations of the disclosure may include one or more of the following optional features. In some implementations, the selected variational embedding includes a prior variational embedding sampled from a variational autoencoder (VAE)-based residual encoder. The operations may further include converting, using a synthesizer, the predicted mel-frequency spectrogram sequence into synthesized speech. In some examples, the sequence of phonemes extracted from the text utterance into the encoded text sequence includes: receiving, from a phoneme look-up table, a respective embedding of each phoneme in the sequence of phonemes; for each phoneme in the sequence of phonemes, processing, using an encoder pre-net neural network of the text encoder, the respective embedding to generate a respective transformed embedding of the phoneme; processing, using a bank of convolutional blocks, the respective transformed embedding to generate convolution outputs; and processing, using a stack of self-attention blocks, the convolution outputs to generate the encoded text sequence.

Optionally, each self-attention block in the stack of self-attention blocks of the spectrogram decoder may include one of an identical lightweight convolution (LConv) block or an identical transformer block. In some implementations, the operations further include upsampling, using the predicted phoneme durations, the output of the duration decoder into a number of frames and obtaining positional embedding that represent phoneme position information for each phoneme in the sequence of phonemes. Here, generating the predicted mel-frequency spectrogram sequence for the text utterance is based on the positional embedding and the upsampling of the output of the duration decoder into the number of frames. The operations may further include concatenating the encoded text sequence, the selected variational embedding, and a reference speaker embedding that represents an identify of a reference speaker associated with the selected variational embedding and generating the output of the duration decoder based on the duration decoder receiving, as input, the concatenation of the encoded text sequence, the variational embedding, and the reference speaker embedding.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
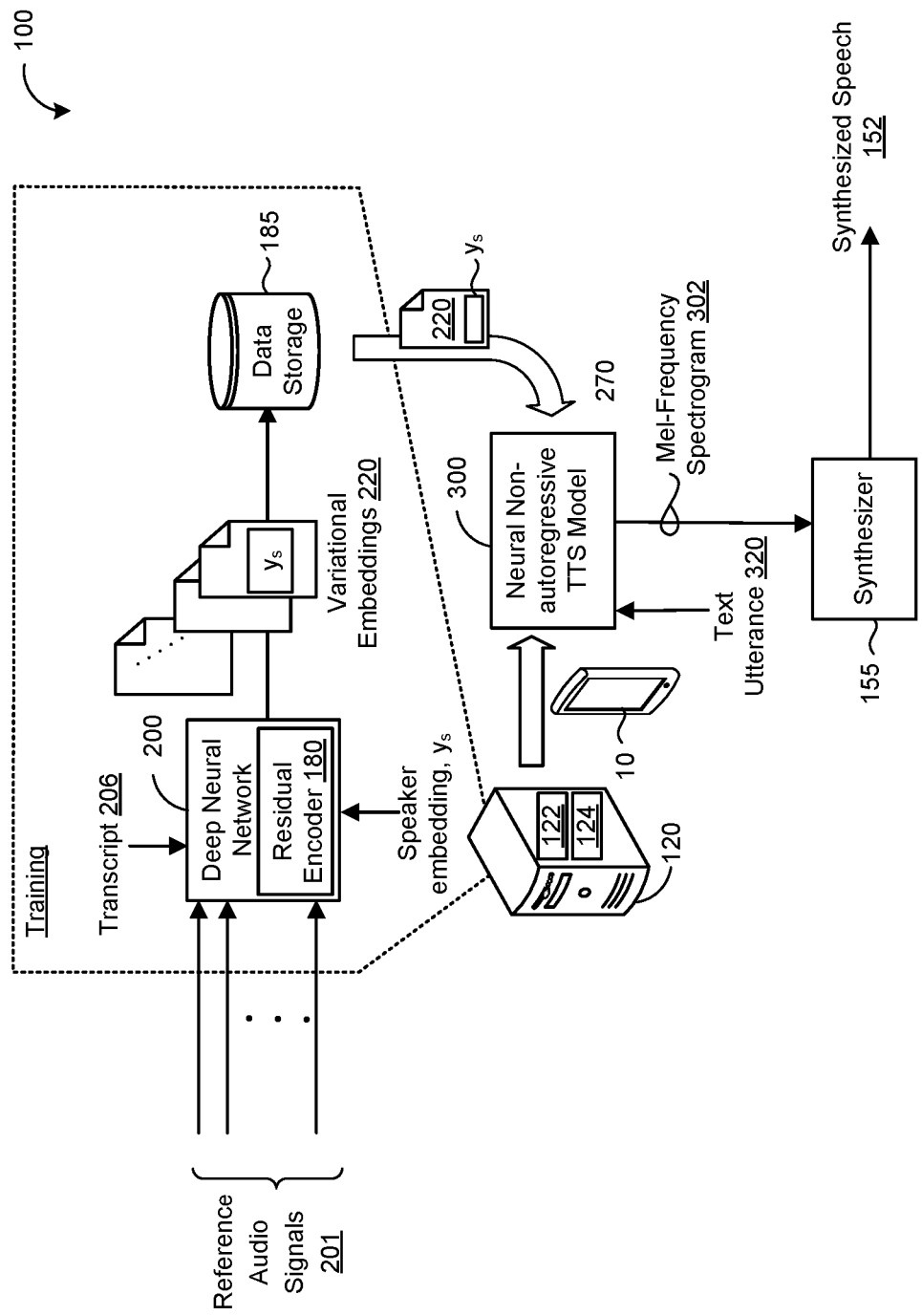
FIG. 1 is an example system for training a deep neural network to provide a non-autoregressive TTS model that predicts a spectrogram for a text utterance.

The synthesis of realistic human speech is an underdetermined problem in that a same text input has an infinite number of reasonable spoken realizations. While end-to-end neural network-based approaches are advancing to match human performance for short assistant-like utterances, neural network models are sometimes viewed as less interpretable or controllable than more conventional models that include multiple processing steps each operating on refined linguistic or phonetic representations. Sources of variability in speech include prosodic characteristics of intonation, stress, rhythm, and style, as well as speaker and channel characteristics. The prosodic characteristics of a spoken utterance convey linguistic, semantic, and emotional meaning beyond what is present in a lexical representation (e.g., a transcript of the spoken utterance).

Neural networks are machine learning models that employ one or more layers of nonlinear units to predict an output for a received input. For instance, neural network-based end-to-end text-to-speech (TTS) model may convert input text to output speech. Neural TTS models provide potential for robustly synthesizing speech by predicting linguistic factors corresponding to prosody that are not provided by text inputs. As a result, a number of applications, such as audiobook narration, news readers, voice design software, and conversational assistants can produce realistically sounding synthesized speech that is not monotonous-sounding.

Many neural end-to-end TTS models utilize an autoregressive model that predicts current values based on previous values. For instance, many autoregressive models are based on recurrent neural networks that use some or all of an internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allows the cell to store previous states for the cell, e.g., for use in generating a current activation or to be provided to other components of the LSTM neural network.

While autoregressive TTS models can synthesize text and generate highly natural speech outputs, their architecture through a series of uni-directional LSTM-based decoder blocks with soft attention inherently makes both training and inference less efficient when implemented on modern parallel hardware compared to fully-feedforward architectures. Moreover, as autoregressive models train via teacher forcing by applying ground truth labels for each time step, autoregressive models are additionally prone to producing discrepancies between training and when the trained model is applied during inference. Together with the soft attention mechanism, these discrepancies can lead to synthesized speech output with reduced quality, such as the synthesized speech exhibiting robustness errors such as babbling, early cut-off, word repetition, and word skipping. The reduction in quality of synthesized speech in autoregressive TTS models may be further exacerbated as a size of the synthesized text increases.

To alleviate the aforementioned drawbacks of autoregressive-based TTS models, implementations herein are directed toward a non-autoregressive neural TTS model augmented with a variational autoencoder (VAE)-based residual encoder. As will become apparent, the VAE-based residual encoder may disentangle latent representations/states from reference audio signals that convey residual information, such as style/prosody information, which cannot be represented by the input text (e.g., phoneme sequence) to be synthesized or speaker identifiers (IDs) for the speakers that spoke the reference audio signals. That is to say, a latent representation enables the output synthesized speech produced by the TTS model to sound like the reference audio signal that was input to the residual encoder.

The non-autoregressive neural TTS model augmented with the VAE-based residual encoder provides a controllable model for predicting mel spectral information (e.g., a predicted mel-frequency spectrogram sequence) for an input text utterance, while at the same time effectively controlling the prosody/style represented in the mel spectral information. For instance, using a selected variational embedding learned by the VAE-based residual encoder to represent an intended prosody/style for synthesizing a text utterance into expressive speech, a spectrogram decoder of the TTS model may predict a mel-frequency spectrogram for the text utterance and provide the mel-frequency spectrogram as input to a synthesizer (e.g., a waveform synthesizer or a vocoder network) for conversion into a time-domain audio waveform indicative of synthesized speech having the intended prosody/style. As will become apparent, the non-autoregressive TTS model is trained on sample input text sequences and corresponding reference mel-frequency spectrogram sequences of human speech alone so that the trained TTS model can convert an input text utterance to a mel-frequency spectrogram sequence having an intended prosody/style conveyed by a learned prior variational embedding.

FIG. 1 shows an example system 100 for training a deep neural network 200 that is augmented with a VAE-based residual encoder 180 to provide a non-autoregressive neural TTS model (or simply 'TTS model') 300, and for predicting a spectrogram (i.e., mel-frequency spectrogram sequence) 302 for a text utterance 320 using the TTS model 300. The system 100 includes a computing system 120 having data processing hardware 122 and memory hardware 124 in communication with the data processing hardware 122 and storing instructions that cause the data processing hardware 122 to perform operations. In some implementations, the computing system 120 (e.g., the data processing hardware 122) or a user computing device 10 executing the trained TTS model 300 provides the spectrogram 302 predicted by the TTS model 300 from the input text utterance 320 to a synthesizer 155 for conversion into a time-domain audio waveform indicative of synthesized speech 152 that may be audibly output as a spoken representation of the input text utterance 320. A time-domain audio waveform includes an audio waveform that defines an amplitude of an audio signal over time. The synthesizer 155 may be separately trained and conditioned on mel-frequency spectrograms for conversion into time-domain audio waveforms.

A mel-frequency spectrogram includes a frequency-domain representation of sound. Mel-frequency spectrograms emphasize lower frequencies, which are critical to speech intelligibility, while de-emphasizing high frequency, which are dominated by fricatives and other noise bursts and generally do not need to be modeled with high fidelity. The synthesizer 155 may include a vocoder neural network that may include any network that is configured to receive mel-frequency spectrograms and generate audio output samples (e.g., time-domain audio waveforms) based on the mel-frequency spectrograms. For example, the vocoder network 155 can be based on the parallel feed-forward neural network described in van den Oord, *Parallel WaveNet: Fast High-Fidelity Speech Synthesis*, available at https://arxiv.org/pdf/1711.10433.pdf, and incorporated herein by reference. Alternatively, the vocoder network 155 can be an autoregressive neural network. The synthesizer 155 may include a waveform synthesizer such as a Griffin-Lim synthesizer or a trainable spectrogram to waveform inverter. The choice of the synthesizer 155 has no impact on resulting prosody/style of the synthesized speech 152, and in practice, only impacts audio fidelity of the synthesized speech 152

Since the input text utterance 320 has no way of conveying context, semantics, and pragmatics to guide a desired prosody/style of the synthesized speech 152, the TTS model 300 may apply a variational embedding 220 as a latent variable specifying an intended prosody/style in order to predict a mel-frequency spectrogram 302 for the text utterance 320 that conveys the intended prosody/style specified by the variational embedding 220. In some examples, the computing system 120 implements the TTS model 300. Here, a user may access the TTS model 300 through a user computing device 10 and provide the input text utterance 320 for the TTS model 300 to synthesize into expressive speech 152 having an intended prosody/style specified by a variational embedding 220. The variational embedding 220 may be selected by the user and correspond to a prior variational embedding 220 sampled from the residual encoder 180. The variational embedding 220 may be a per-speaker variational embedding 220 that the user may select by providing a speaker identifier (ID) (i.e., through an interface executing on the user computing device 10) that identifies a speaker who speaks with the intended prosody/style. Here, each speaker ID may map to a respective per-speaker variational embedding 220 previously learned by the residual encoder 180. Additionally or alternatively, the user could provide an input specifying a particular vertical associated with a respective prosody/style. Here, different verticals (e.g., newscasters, sportscasters, etc.) may each map to a respective variational embedding 220 previously learned by the residual encoder 180 that conveys the respective prosody/style associated with the vertical. In these examples, the synthesizer 155 may reside on the computing system 120 or the user computing device 10. When the synthesizer 155 resides on the computing system 120, the computing system 120 may transmit a time-domain audio waveform representing the synthesized speech 152 to the user computing device 10 for audible playback. In other examples, the user computing device 10 implements the TTS model 300. The computing system may include a distributed system (e.g., cloud computing environment).

In some implementations, the deep neural network 200 is trained on a large set of reference audio signals 201. Each reference audio signal 201 may include a spoken utterance of human speech recorded by a microphone and having a prosodic/style representation. During training, the deep neural network 200 may receive multiple reference audio signals 201 for a same spoken utterance, but with varying prosodies/styles (i.e., the same utterance can be spoken in multiple different ways). Here, the reference audio signals 201 are of variable-length such that the duration of the spoken utterances varies even though the content is the same. The deep neural network 200 may also receive multiple sets of reference audio signals 201 where each set includes reference audio signals 201 for utterances having similar prosodies/styles spoken by a same respective speaker, but conveying different linguistic content. The deep neural network 200 augmented with the VAE-based residual encoder 180 is configured to encode/compress the prosodic/style representation associated with each reference audio signal 201 into a corresponding variational embedding 220. The variational embedding 220 may include a fixed-length variational embedding 220. The deep neural network 200 may store each variational embedding 220 in storage 185 (e.g., on the memory hardware 124 of the computing system 120) along with a corresponding speaker embedding, $y_s$, representing a speaker identity 205 (FIG. 2) of a reference speaker that uttered the reference audio signal 201 associated the variational embedding 220. The variational embedding 220 may be a per-speaker variational embedding that includes an aggregation (e.g., mean) of multiple variational embeddings 220 encoded by the residual encoder 180 from reference audio signals 201 spoken by a same speaker.

During inference, the computing system 120 or the user computing device 10 may use the trained TTS model 300 to predict a mel-frequency spectrogram sequence 302 for a text utterance 320. The TTS model 300 may select a variational embedding 220 from the storage 185 that represents an intended prosody/style for the text utterance 320. Here, the variational embedding 220 may correspond to a prior variational embedding 220 sampled from the VAE-based residual encoder 180. The TTS model 300 may predict the mel-frequency spectrogram sequence 302 for the text utterance 320 using the selected variational embedding 220. In the example shown, the synthesizer 155 uses the predicted mel-frequency spectrogram sequence 302 to produce synthesized speech 152 having the intended prosody/style specified by the variational embedding 220.

During inference, the computing system 120 or the user computing device 10 may use the trained TTS model 300 to predict a mel-frequency spectrogram sequence 302 for a text utterance 320. The TTS model 300 may select a variational embedding 220 from the storage 185 that represents an intended prosody/style for the text utterance 320. Here, the variational embedding 220 may correspond to a prior variational embedding 220 sampled from the VAE-based residual encoder 180. The TTS model 300 may predict the mel-frequency spectrogram sequence 302 for the text utterance 320 using the selected variational embedding 220. In the example shown, the synthesizer 155 uses the predicted mel-frequency spectrogram sequence 302 to produce synthesized speech 152 having the intended prosody/style specified by the variational embedding 220

In a non-limiting example, an individual could train the deep neural network 200 to learn a per-speaker variational embedding that conveys a prosodic/style representation associated with a particular speaker. For instance, the host of the Techmeme Ride Home podcast, Brian McCullough, could train the deep neural network 200 on reference audio signals 201 that include previous episodes of the podcast along with input text sequences 206 corresponding to transcripts of the reference audio signals 201. During training, the VAE-based residual encoder 180 may learn a per-speaker variational embedding 220 that represents the prosodic/style of Brian narrating the Ride Home podcast. Brian could then apply this per-speaker variational embedding 220 for use by the trained TTS model 300 (executing on the computing system 120 or the user computing device 10) to predict mel-frequency spectrogram sequences 302 for text utterances 320 corresponding to a transcript for a new episode of the Ride Home podcast. The predicted mel-frequency spectrogram sequences 302 may be provided as input to the synthesizer 155 for producing synthesized speech 152 having Brian's unique prosody/style as specified by his per-speaker variational embedding 220. That is, the resulting synthesized speech 152 may sound exactly like Brian's voice and possess Brian's prosody/style for narrating the episode of the Ride Home podcast. Accordingly, to air the new episode, Brian only has to provide a transcript for the episode and use the trained TTS model 300 to produce synthesized speech 302 that may be streamed to the loyal listeners (also referred to as Mutant Podcast Army) of the Ride Home podcast.

Figure 2:
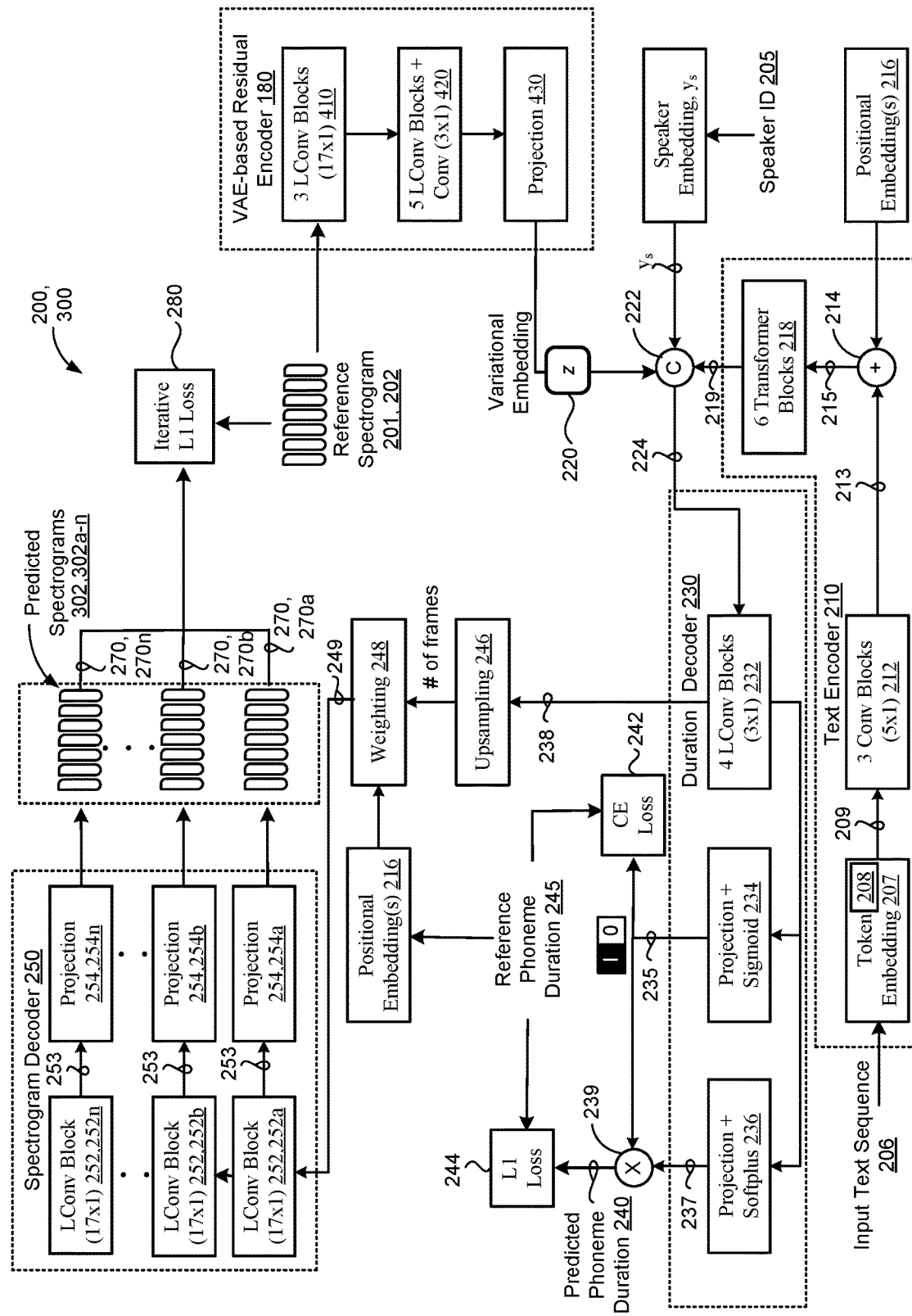
FIG. 2 is a schematic view of a non-autoregressive neural network training a non-autoregressive TTS model.

FIG. 2 shows a non-autoregressive neural network (e.g., the deep neural network of FIG. 1) 200 for training the non-autoregressive TTS model 300. The deep neural network 200 includes the VAE-based residual encoder 180, a text encoder 210, a duration decoder 230, and a spectrogram decoder 250. The deep neural network 200 may be trained on training data that includes multiple reference audio signals 201 and corresponding input text sequences 206. Each reference audio signal 201 includes a spoken utterance of human speech and the corresponding input text sequence 206 corresponds to a transcript of the reference audio signal 201. In the example shown, the VAE-based residual encoder 180 is configured to encode the reference audio signal 201 into a variational embedding (z) 220. Specifically, the residual encoder 180 receives a reference mel-frequency spectrogram sequence 202 sampled from the reference audio signal 201 and encodes the reference mel-frequency spectrogram sequence 202 into the variational embedding 220, whereby the variational embedding 220 disentangles style/prosody information from the reference audio signal 201 corresponding to the spoken utterance of human speech. As such, the variational embedding 220 corresponds to a latent state of a reference speaker, such as affect and intent, which contributes to the prosody, emotion, and/or speaking style of the reference speaker. As used herein, the variational embedding 220 includes both style information and prosody information. In some examples, the variational embedding 220 includes a vector of numbers having a capacity represented by a number of bits in the variational embedding 220. The reference mel-frequency spectrogram sequence 202 sampled from the reference audio signal 201 may have a length $L_R$ and a dimension $D_R$. As used herein, the reference mel-frequency spectrogram sequence 202 includes a plurality of fixed-length reference mel-frequency spectrogram frames sampled/extracted from the reference audio signal 201. Each reference mel-frequency spectrogram frame may include a duration of five milliseconds.

Figure 5:
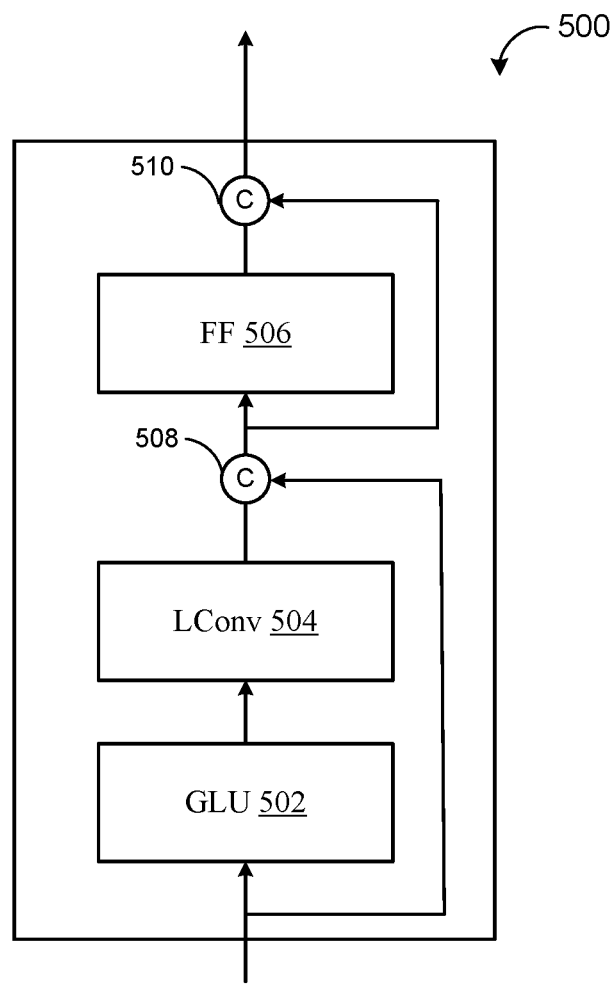
FIG. 5 is a schematic view of an example lightweight convolution block.

The VAE-based residual encoder 180 corresponds to a posterior network that enables unsupervised learning of latent representations (i.e. variational embeddings (z)) of speaking styles. Learning variational embeddings through the use of VAE networks provides favorable properties of disentangling, scaling, and combination for simplifying style control compared to heuristic-based systems. In some implementations, and as shown in FIG. 2, the VAE-based residual encoder 180 includes a global VAE network that encodes a global variational embedding 220 from the entire reference mel-frequency spectrogram sequence 202. Here, the global VAE network 400a includes two stacks 410, 420 of lightweight convolution (LConv) blocks each having multi-headed attention. FIG. 5 shows a schematic view 500 of an example LConv block having a gated linear unit (GLU) layer 502, a LConv layer 504 configured to receive an output of the GLU layer 502, and a feedforward (FF) layer 506. The example LConv block 500 also includes a first residual connection 508 (e.g., first concatenator 508) configured to concatenate an output of the LConv layer 504 with an input to the GLU layer 502. The FF layer 506 is configured to receive, as input, the first residual connection 508 that concatenates the output of the LConv layer 504 with the input to the GLU layer 502. The example LConv block 500 also includes a second residual connection 510 (e.g., second concatenator 510) configured to concatenate the output of the FF layer 506 with the first residual connection 508. The example LConv block 500 may perform FF mixing in the FF layer 506 using a structure $\text{ReLU}(W_1 X+b_1)W_2+b_2$ where $W_1$ increases the dimension by a factor of 4. Each LConv block in the first and second stacks 410, 420 of the global VAE network 180 may include eight (8) heads. In some examples, the first stack 410 of LConv blocks includes three (3) 17×1 LConv blocks and the second stack 420 of LConv blocks following the first stack 410 includes five 17×1 LConv blocks interleaved with 3×1 convolutions. This configuration of two stacks 410, 420 of LConv blocks 410, 420 permits the global VAE network 180 to successively down sample latent representations before applying global average pooling to obtain the final global variational embedding 220. A projection layer 430 may project a dimension of the global variational embedding 220 output from the second stack 420 of LConv blocks. For instance, the global variational embedding 220 output from the second stack 420 of LConv blocks may have a dimension of eight (8) and the projection layer 430 may project the dimension to thirty-two (32).

In other implementations, the VAE-based residual encoder 180 includes a phoneme-level fine-grained VAE network that the non-autoregressive neural network 200 may employ in lieu of the global VAE network depicted in FIG. 2. Whereas the global VAE network depicted in FIG. 2 encodes the reference mel-frequency spectrogram sequence 202 into a global variational embedding 220 at the utterance level, the phoneme-level fine-grained VAE network is configured to encode spectrogram frames from the reference mel-frequency spectrogram sequence 202 associated with each phoneme in the input text sequence 206 into a respective phoneme-level variational embedding 220. More specifically, the phoneme-level fine-grained VAE network may align the reference mel-frequency spectrogram sequence 202 with each phoneme in a sequence of phonemes extracted from the input text sequence 206 and encode a sequence of phoneme-level variational embeddings 220. Accordingly, each phoneme-level variational embedding 220 in the sequence of phoneme-level variational embeddings 220 encoded by the phoneme-level fine-grained VAE network encodes a respective subset of one or more spectrogram frames from the reference mel-frequency spectrogram sequence 202 that includes a respective phoneme in the sequence of phonemes extracted from the input text sequence 206. The phoneme-level fine-grained VAE network may initially concatenate the reference mel-frequency spectrogram sequence 202 to a speaker embedding $y_s$, representing a speaker that spoke the utterance associated with the reference mel-frequency spectrogram sequence 202, and positional embeddings 216 indicating phoneme position information for each phoneme in the sequence of phonemes extracted from the input text sequence 206. Each positional embedding 216 may include fixed-length vector that contains information about a specific position of a respective phoneme in the sequence of phonemes extracted from the input text sequence 206. Subsequently, the concatenation is applied to a stack of five (5) 8-headed 17×1 LConv blocks to compute attention with a layer normalized encoded text sequence 219 output from the text encoder 210.

Figure 4:
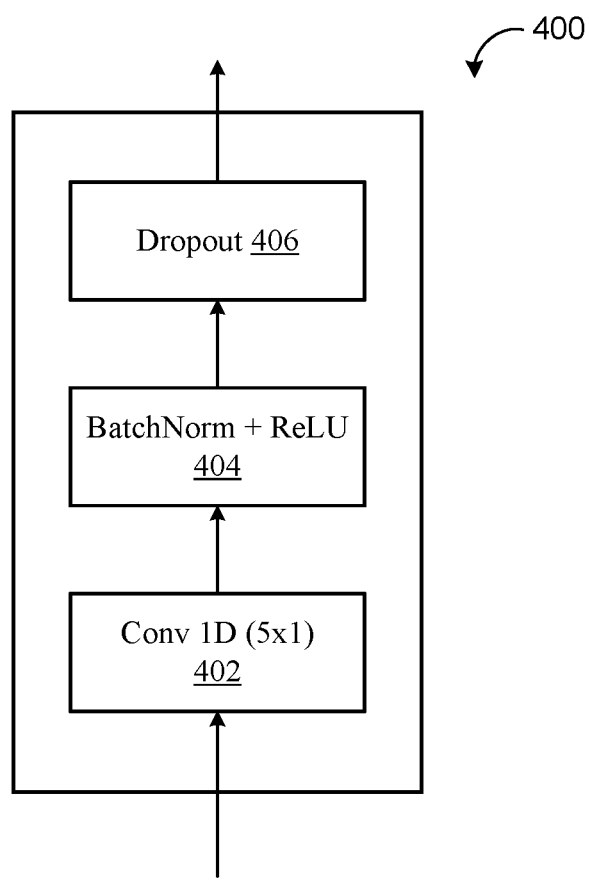
FIG. 4 is a schematic view of an example convolutional block.

With continued reference to FIG. 2, the text encoder 210 encodes the input text sequence 206 into a text encoding sequence 219. The text encoding sequence 219 includes an encoded representation of a sequence of speech units (e.g., phonemes) extracted from the input text sequence 206. The input text sequence 206 may include words each having one or more phonemes, silences at all word boundaries, and punctuation marks. Thus, the input text sequence 206 includes a sequence of phonemes and the text encoder 210 may receive, from a token embedding look-up table 207, a respective token embedding for each phoneme in the sequence of phonemes. Here, the respective token embedding includes a phoneme embedding. However, in other examples, the token embedding look-up table 207 may obtain token embeddings for other types of speech inputs associated with the input text sequence 206 instead of phonemes, such as, without limitation, sub-phonemes (e.g., senomes), graphemes, word pieces, or words in the utterance. After receiving the respective token embedding of each phoneme in the sequence of phonemes, the text encoder 210 uses an encoder pre-net neural network 208 to process each respective token embedding to generate a respective transformed embedding 209 of each phoneme. Thereafter, a bank of convolutional (Conv) blocks 212 may process the respective transformed embeddings 209 to generate convolution outputs 213. In some examples, the bank of Conv blocks 212 includes three (3) identical 5×1 Conv blocks. FIG. 4 shows a schematic view 400 an example Conv block having a Conv layer 402, a batch normalization layer 404, and a dropout layer 406. During training, the batch normalization layer 404 may apply batch normalization to reduce internal covariate shift. The dropout layer 406 may reduce overfitting. Finally, an adder 214 combines the convolution outputs 213 with positional embeddings 216 to generate an input 215, and a stack of self-attention blocks 218 processes the input 215 to generate the encoded text sequence 219. In the example shown, the stack of self-attention blocks 218 includes six (6) transformer blocks. In other examples, the self-attention blocks 218 may include LConv blocks in lieu of transformer blocks.

Notably, since each convolution output 213 flows through the stack of self-attention blocks 218 simultaneously, and therefore the stack of self-attention blocks 218 have no knowledge of position/order of each phoneme in the input text utterance, the positional embeddings 216 combined with the convolution outputs 213 inject necessary position information indicating the order of each phoneme in the input text sequence 206. By contrast, autoregressive encoders that incorporate recurrent neural networks (RNNs) inherently take the order of each phoneme into account since each phoneme is parsed from the input text sequence in a sequential matter. However, the text encoder 210 integrating the stack of self-attention blocks 218 that employ multi-head self-attention avoids the recurrence of auto-regressive encoders to result in drastically reduced training time, and theoretically, capture longer dependences in the input text sequence 206.

With continued reference to FIG. 2, a concatenator 222 concatenates the variational embedding 220 from the residual encoder 180, the encoded text sequence 219 output from the text encoder 210, and a reference speaker embedding ys representing a speaker identity 205 of a reference speaker that uttered the reference audio signal. The duration decoder 230 is configured to decode the concatenation 224 of the encoded text sequence 219, the variational embedding 220, and the reference speaker embedding ys to generate an output 238 of the duration decoder 230 for predicting a phoneme duration 240 for each phoneme in the sequence of phonemes in the input text sequence 206. In some implementations, the duration decoder 230 includes a stack of self-attention blocks 232 followed by two independent projections. In the example shown, the stack of self-attention blocks includes four (4) 3×1 LConv blocks. As described above with reference to FIG. 5, each LConv block in the stack of self-attention blocks 232 may include a GLU unit 502, a LConv layer 504, and a FF layer 506 with residual connections. The duration decoder 230 may predict the phoneme duration 240 for each phoneme by predicting a probability of non-zero duration 235 for each phoneme and predicting a continuous phoneme duration 237 for each phoneme. As the sequence of phonemes in the input text sequence 206 includes regular phonemes, silences between word boundaries, and punctuation marks, only the regular phonemes are associated with non-zero duration while the silences and punctuation marks are generally associated with non-zero duration. Accordingly, the duration decoder 230 may use a sigmoid activation 234 following a first one of the two independent activations to predict the probability of non-zero duration 235 and use a softplus activation following a second one of the two independent projections to predict the continuous phoneme duration for each phoneme. For each phoneme, the duration decoder may determine whether the probability of non-zero duration 235 predicted for the corresponding phoneme is less than a threshold value, and when the probability of non-zero duration is less than the threshold value, a multiplier 239 may zero-out the continuous phoneme duration 237 predicted by the softplus activation 236 for the corresponding phoneme. Otherwise, when the probability of non-zero duration is not less than the threshold value, the predicted phoneme duration 240 may be set equal to the continuous phoneme duration 237 predicted by the softplus activation 236.

A reference phoneme duration 245 for each phoneme may be sampled from the reference audio signal 201 using an external aligner, such as a hidden Markov model-based external aligner. The duration decoder 230 may compute a cross-entropy (CE) loss term 242 between the reference phoneme durations 245 and the probability of non-zero durations 235. The duration decoder 230 may compute an L1 loss term 244 between the predicted phoneme durations 240 and the reference phoneme durations 245. A phoneme durations loss based on the two-level CE and L1 loss terms 242,244 may be computed for the input text sequence 206.

With continued reference to FIG. 2, an upsampling layer 246 uses the reference phoneme durations 245 sampled from the reference audio signal to upsample the output 238 of the duration decoder 230 into a number of frames specified by the reference phoneme durations 245. Here, the number of frames corresponds to the length of the reference mel-frequency spectrogram sequence 202 (i.e., the number of frames generated by the upsampling layer 246 is equal to the number of reference spectrogram frames in the reference mel-frequency spectrogram sequence 202). One or more positional embeddings 216 may be added to the output 238 of the upsampling layer 246 in order to inform the spectrogram decoder 250 of respective frame positions within each phoneme. The one or more different types of positional embeddings 216 may include at least one of a transformer-style sinusoidal embedding of a frame position within a phoneme, a transformer-style sinusoidal embedding of phoneme duration, or a fractional progression of a frame within a phoneme. In some implementations, when several different types of the aforementioned positional embeddings 216 are added, a weighting layer 248 learns positional weights 249 in order to combine the one or more positional embeddings 216 with the output 238 of the duration decoder 230. For instance, for each channel and positional embedding, the weighting layer 248 may learn softmax normalized weights to teach the non-autoregressive neural network 200 to learn to choose which of the position embeddings 216 to copy over to the spectrogram decoder 250.

The spectrogram decoder 250 is configured to receive, as input, the upsampled output 238 of the duration decoder 230 combined with the weighted positional embeddings 216, and generate, as output, one or more predicted mel-frequency spectrogram sequences 302 for the input text sequence 206. The spectrogram decoder 250 may include a stack of multiple self-attention blocks 252, 252*a*-*n* with multi-headed attention. In some examples, the spectrogram decoder 250 includes six (6) eight-headed 17×1 LConv blocks with 0.1 dropout. The spectrogram decoder 250 may include more or less than six LConv blocks. As described above with reference to FIG. 5, each LConv block in the stack of self-attention blocks 232 may include a GLU unit 502, a LConv layer 504, and a FF layer 506 with residual connections. In other examples, each self-attention block 252 in the stack includes an identical transformer block.

In some implementations, the spectrogram decoder 250 generates a respective predicted mel-frequency spectrogram sequence 302, 302*a*-*n* as output from each self-attention block 252 in the stack of self-attention blocks 252, 252*a*-*n*. The network 200 may be trained so that a number of frames in each respective predicted mel-frequency spectrogram sequence 302 is equal to a number of frames in the reference mel-frequency spectrogram sequence 202 input to the residual encoder 180. In the example shown, each self-attention block 252*a*-*n* is paired with a corresponding projection layer 254*a*-*n* that projects an output 253 from the self-attention block 252 to generate the respective predicted mel-frequency spectrogram sequence 302*a*-*n* having a dimension that matches a dimension of the reference mel-frequency spectrogram sequence 202. In some examples, the projection layer 254 projects a 128-bin predicted mel-frequency spectrogram sequence 302. By predicting multiple mel-frequency spectrogram sequences 302*a*-*n*, the non-autoregressive neural network 200 may be trained using iterative spectrogram loss. That is, for each respective predicted mel-frequency spectrogram sequence 302*a*-*n*, a respective spectrogram loss 270, 270*a*-*n* may be determined based on the corresponding predicted mel-frequency spectrogram sequence 302 and the reference mel-frequency spectrogram sequence 202. The respective spectrogram loss 270 may include an L1 loss term. For instance, a first spectrogram loss 270*a* may be determined based on a first predicted mel-frequency spectrogram sequence 302*a* and the reference mel-frequency spectrogram sequence 202, a second spectrogram loss 270*b* may be determined based on a first predicted mel-frequency spectrogram sequence 302*a* and the reference mel-frequency spectrogram sequence 202, and so on until all of the respective spectrogram losses 270*a*-*n* are iteratively determined the predicted mel-frequency spectrogram sequence 302*a*-*n*. The spectrogram losses 270 may be aggregated to generate a final spectrogram loss 280. The final spectrogram loss 280 may correspond to an iterative L1 loss term 280. Aggregating the spectrogram losses 270*a*-*n* may include summing the spectrogram losses 270*a*-*n* to obtain the final spectrogram loss 280. Optionally, aggregating the spectrogram losses may include averaging the spectrogram losses.

The deep neural network 200 may be trained so that a number of frames in each respective predicted mel-frequency spectrogram sequence 302 is equal to a number of frames in the reference mel-frequency spectrogram sequence 202 input to the residual encoder 180. Moreover, the deep neural network 200 is trained so that data associated with the reference and predicted mel-frequency spectrogram sequences 202, 302 substantially match one another. The predicted mel-frequency spectrogram sequence 302 may implicitly provide a prosodic/style representation of the reference audio signal 201.

Figure 3:
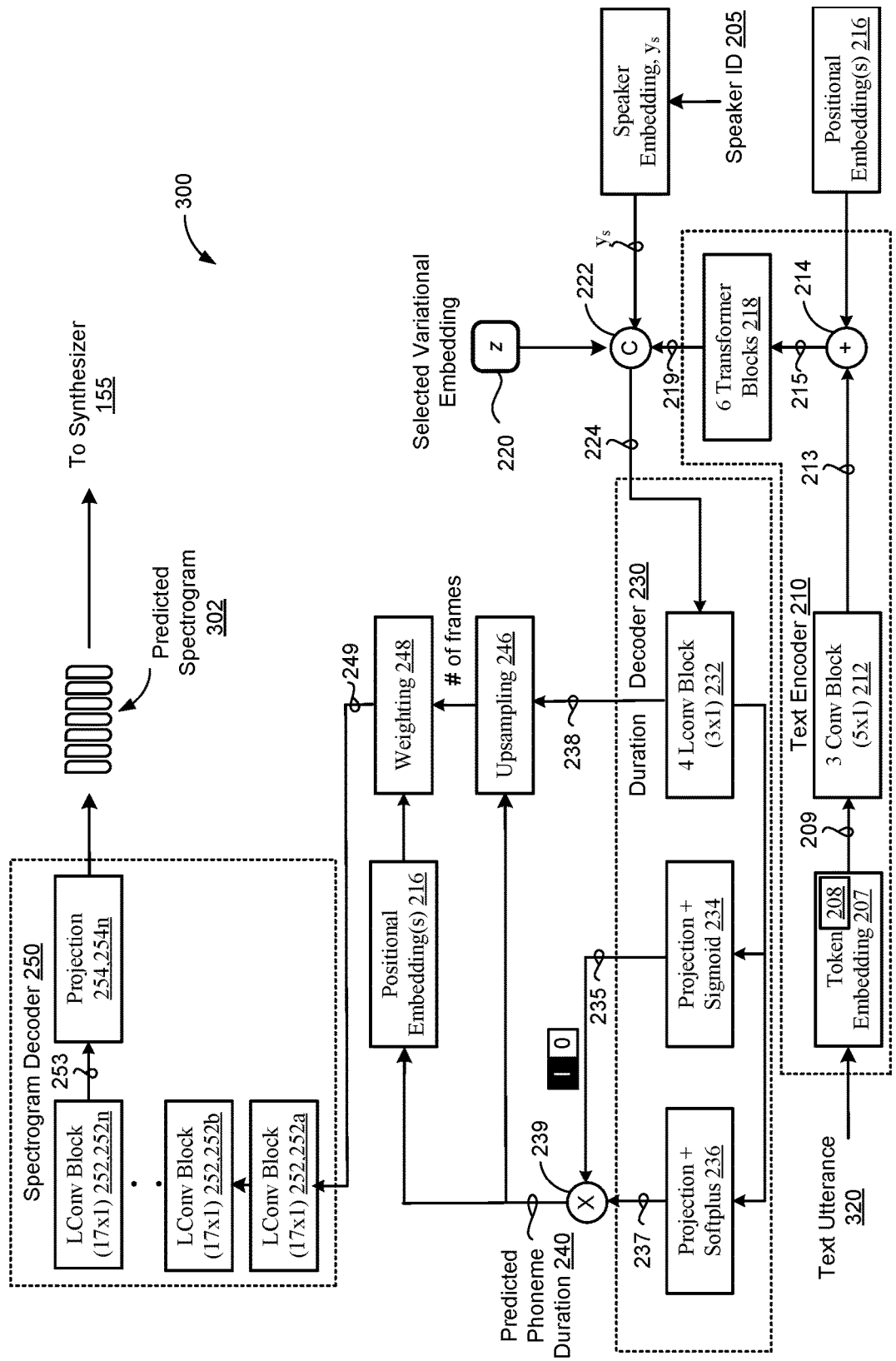
FIG. 3 is a schematic view of executing a trained non-autoregressive TTS model trained by the non-autoregressive deep neural network of FIG. 2.

FIG. 3 shows an example of the non-autoregressive TTS model 300 trained by the non-autoregressive deep neural network 200 of FIG. 2. Specifically, FIG. 3 depicts the TTS model 300 using a selected variational embedding 220 to predict a mel-frequency spectrogram sequence 302 for an input text utterance 320, whereby the selected variational embedding 220 represents an intended prosody/style for the text utterance 320. During inference, the trained TTS model 300 executes on the computing system 120 or the user computing device 10 and may use the selected variational embedding 220 to predict the corresponding mel-spectrogram sequence 302 for the input text utterance 320. Here, the TTS model 300 selects a variational embedding 220 from the storage 185 that represents an intended prosody/style for the text utterance 320. In some examples, a user provides a user input indication indicating selection of the intended prosody/style the user wants the resulting synthesized speech 152 to convey for the text utterance 320 and the TTS model 300 selects the appropriate variational embedding 220 from the data storage 185 that represents the intended prosody/style. In these examples, the intended prosody/style may be selected by the user by indicating a speaker ID 205 associated with a particular speaker who speaks with the intended prosody/style and/or specifying a particular prosodic vertical (e.g., newscaster, sportscaster, etc.) that corresponds to the intended prosody/style. The selected variational embedding 220 may correspond to a prior variational embedding 220 sampled from the VAE-based residual encoder 180. The trained TTS model 300 generates synthesized speech 152, using a synthesizer 155, with the intended prosody/style (e.g., selected variational embedding 220) for the respective input text utterance 320. That is, the selected variational embedding 220 may include an intended prosody/style (e.g., newscaster, sportscaster, etc.) stored on the residual encoder 180. The selected variational embedding 220 conveys the intended prosody/style via synthesized speech 152 for the input text utterance 320.

In additional implementations, the trained TTS model 300 employs the residual encoder 180 during inference to extract/predict a variational embedding 220 on the fly for use in predicting a mel-frequency spectrogram sequence 302 for the input text utterance 320. For instance, the residual encoder 180 may receive a reference audio signal 201 (FIG. 2) uttered by a human user that conveys the intended prosody/style (e.g., "Say it like this") and extract/predict a corresponding variational embedding 220 that represents the intended prosody/style. Thereafter, the trained TTS model 300 may use the variational embedding 220 to effectively transfer the intended prosody/style conveyed by the reference audio signal 201 to the mel-frequency spectrogram sequence 302 predicted for the input text utterance 320. Accordingly, the input text utterance 320 to be synthesized into expressive speech 152 and the reference audio signal 201 conveying the intended prosody/style to be transferred to the expressive speech 152 may include different linguistic content.

In particular, the text encoder 210 encodes a sequence of phonemes extracted from the text utterance 320 into an encoded text sequence 219. The text encoder 210 may receive, from the token embedding look-up table 207, a respective token embedding for each phoneme in the sequence of phonemes extracted from the text utterance 320. After receiving the respective token embedding of each phoneme in the sequence of phonemes extracted from the text utterance 320, the text encoder 210 uses the encoder pre-net neural network 208 to process each respective token embedding to generate a respective transformed embedding 209 of each phoneme. Thereafter, the bank of Conv blocks 212 (e.g., three (3) identical 5×1 Conv blocks) processes the respective transformed embeddings 209 to generate convolution outputs 213. Finally, an adder 214 combines the convolution outputs 213 with positional embeddings 216 to generate an input 215, and a stack of self-attention blocks 218 (e.g., six transformer blocks) processes the input 215 to generate the encoded text sequence 219. The positional embeddings 216 combined with the convolution outputs 213 provide the necessary position information that indicates the order of each phoneme in the sequence of phonemes for the text utterance 320.

With continued reference to FIG. 3, the concatenator 222 concatenates the selected variational embedding 220, the encoded text sequence 219, and optionally, a reference speaker embedding $y_s$ to generate the concatenation 224. Here, the reference speaker embedding ys may represent the speaker identity 205 of a reference speaker that uttered one or more reference audio signal 201 associated with the selected variational embedding 220 or the speaker identity 205 of some other reference speaker having voice characteristics to be conveyed in the resulting synthesized speech 152. The duration decoder 230 is configured to decode the concatenation 224 of the encoded text sequence 219, the selected variational embedding 220, and the reference speaker embedding ys to generate an output 238 of the duration decoder 230 for predicting a phoneme duration 240 for each phoneme in the sequence of phonemes in the input text utterance 320.

In some implementations, the duration decoder 230 includes a stack of self-attention blocks 232 (e.g., four (4) 3×1 LConv blocks) followed by two independent projections 234, 236. The duration decoder 230 may predict the phoneme duration for each phoneme by predicting a probability of non-zero duration 235 for each phoneme and predicting a continuous phoneme duration 237 for each phoneme. As the sequence of phonemes in the input text utterance 320 includes regular phonemes, silences between word boundaries, and punctuation marks, only the regular phonemes are associated with non-zero duration while the silences and punctuation marks are generally associated with the non-zero duration. Accordingly, the duration decoder 230 may use a sigmoid activation 234 following a first one of the two independent activations to predict the probability of non-zero duration 235 and use a softplus activation 236 following a second one of the two independent projections to predict the continuous phoneme duration 237 for each phoneme. The duration decoder 230 determines for each phoneme whether the probability of non-zero duration 235 is less than a threshold value, and when the probability of non-zero duration 235 is less than the threshold value, a multiplier 239 may zero-out the continuous phoneme duration 237 predicted by the softplus activation 236 for the corresponding phoneme. Otherwise, when the probability of non-zero duration 235 is not less than the threshold value, the predicted phoneme duration 240 may be set equal to the continuous phoneme duration 237 predicted by the softplus activation 236.

The trained TTS model 300 may include an upsampling layer 246 that uses the predicted phoneme durations 240 to upsample the output 238 of the duration decoder 230 into a number of frames. Here, the number of frames corresponds to the predicted length of the predicted spectrogram 302 determined by the predicted phoneme duration 240 and the output 238 for the corresponding input text utterance 320. The TTS model 300 may obtain one or more positional embeddings 216 representing phoneme position information for each phoneme in the sequence of phonemes for the input text utterance 320. The one or more positional embeddings 216 may be added to the number of frames of the output 238 generated by the upsampling layer 246 in order to inform the spectrogram decoder 250 of respective frame positions within each phoneme. That is, the stack of self-attention blocks 252 may have no knowledge of position/order of each phoneme in the input text utterance 320, therefore positional embeddings 216 provide the necessary order of each phoneme in the phoneme sequence. In some implementations, several different types of positional embeddings 216 are added to the output 238 and a weighting layer 248 learns positional weights 249 in order to combine the one or more positional embeddings 216 with the output 238 of the duration decoder 230. For instance, for each channel and positional embedding 216, the weighting layer 248 may learn softmax normalized weights to teach the non-autoregressive neural network 200 to learn to choose which of the position embeddings 216 to copy over to the spectrogram decoder 250. The one or more position embeddings 216 may include the following types of positional embeddings: transformer-style sinusoidal embeddings each indicating a frame position within a phoneme; a transformer-style sinusoidal embeddings each indicating the predicted phoneme duration of a respective phoneme; and a fractional progression of a frame in a phoneme.

The spectrogram decoder 250 is configured to generate, based on the learned positional weights 249 derived from the output 238 of the duration decoder 230 and the predicted phoneme durations 240 after upsampling, a predicted mel-frequency spectrogram sequence 302 for the text utterance 320. Here, the predicted mel-frequency spectrogram sequence 302 has the intended prosody/style specified by the selected variational embedding 220. The predicted mel-frequency spectrogram sequence 302 for the text utterance 320 is based on the positional embeddings 216 and the upsampling of the output 238 of the duration decoder 230 into the number of frames.

The spectrogram decoder 250 generates a respective predicted mel-frequency spectrogram sequence 302 as output from the last self-attention block 252 in the stack of self-attention blocks 252a-n. Here, each self-attention block 252 in the stack of self-attention blocks 252 of the spectrogram decoder 250 includes one of an identical LConv block or an identical transformer block. In some examples, the spectrogram decoder 250 includes six (6) eight-headed 17×1 LConv blocks with 0.1 dropout. The output of the last feedforward (FF) layer 506 (FIG. 5) for each self-attention block 252 is provided as input to the subsequent self-attention block 252. That is, the GLU unit 502 (FIG. 5) and the LConv layer 504 (FIG. 5) of the first self-attention block 252a in the stack of self-attention blocks 252a-n processes the output 238 from the duration decoder 230 and the predicted phoneme durations 240 and output from the last FF layer 506 of the first self-attention block 252a is provided as input to the subsequent second self-attention block 252b in the stack of self-attention blocks 252. The output of the last FF layer of each self-attention block 252 is provided as input to the subsequent self-attention block 252 until the last self-attention block 252n in the stack of self-attention blocks 252 is reached. The last self-attention block 252n (e.g., the sixth self-attention block 252) in the stack of self-attention blocks 252 is paired with a corresponding projection layer 254 that projects an output 253 from the last self-attention block 252 to generate the respective predicted mel-frequency spectrogram sequence 302.

The predicted mel-frequency spectrogram sequence 302 generated by the spectrogram decoder 250 corresponds to the input text utterance 320 and conveys the intended prosody/style indicated by the selected variational embedding 220. The trained TTS model 300 provides the predicted mel-frequency spectrogram sequence 302 for the input text utterance 320 to the synthesizer 155 for conversion into a time-domain audio waveform indicative of synthesized speech 152. The synthesized speech 152 may be audibly output as spoken representation of the input text utterance 320 including the intended prosody/style as indicated by the selected variational embedding 220.

Figure 6:
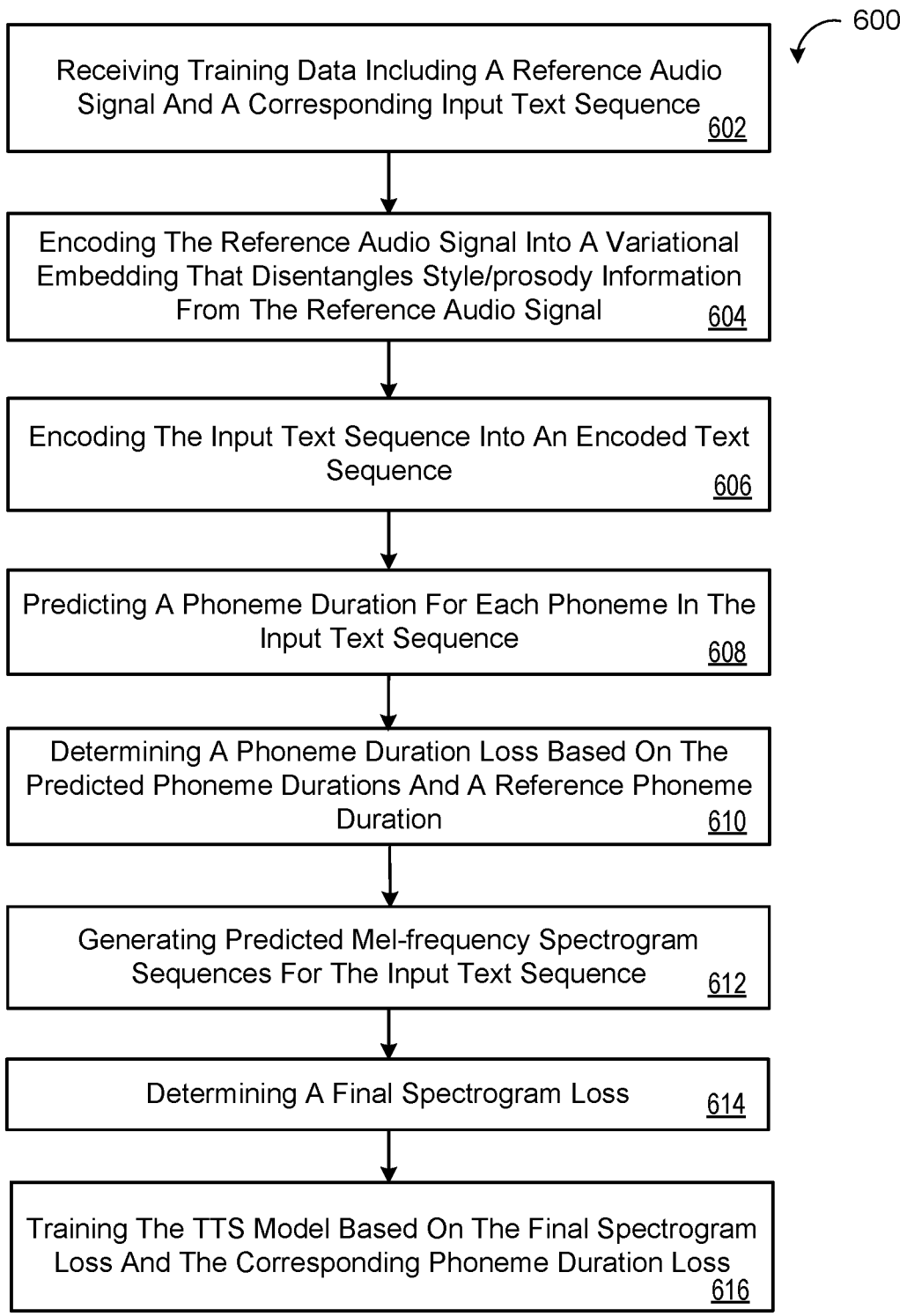
FIG. 6 is a flowchart of an exemplary arrangement of operations for a computer-implemented method for training a non-autoregressive TTS model.

FIG. 6 is a flowchart of an exemplary arrangement of operations for a computer-implemented method 600 for training a non-autoregressive TTS model. The method 600, at step 602, includes receiving training data including a reference audio signal 201 and a corresponding input text sequence 206. The reference audio signal 201 includes a spoken utterance and the input text sequence 206 corresponds to a transcript of the reference audio signal 201. The method 600, at step 604, includes encoding, using a residual encoder 180, the reference audio signal 201 into a variational embedding 220. The variational embedding 220 disentangles the style/prosody information from the reference audio signal 201. The method 600, at step 606, includes encoding, using a text encoder 210, the input text sequence 206 into an encoded text sequence 219. The method 600, at step 608, includes predicting, using a duration decoder 230 and based on the encoded text sequence 219 and the variational embedding 220, a phoneme duration 240 for each phoneme in the input text sequence 206.

The method 600, at step 610, includes determining a phoneme duration loss 244 based on the predicted phoneme durations 240 and a reference phoneme duration 245 sampled from the reference audio signal 201 for each phoneme in the input text sequence 206. The method 600, at step 612, includes generating, as output from a spectrogram decoder 250 that includes a stack of self-attention blocks 252 and based on an output 238 of the duration decoder 230, one or more predicted mel-frequency spectrogram sequences 302 for the input text sequence 206. The method 600, at step 614, includes determining a final spectrogram loss 280 based on the one or more predicted mel-frequency spectrogram sequences 302 and a reference mel-frequency spectrogram sequence sampled from the reference audio signal 201. The method 600, at step 616, includes training the TTS model 300 based on the final spectrogram loss 280 and the corresponding phoneme duration loss 244 determined for each phoneme in the input text sequence 206.

Figure 7:
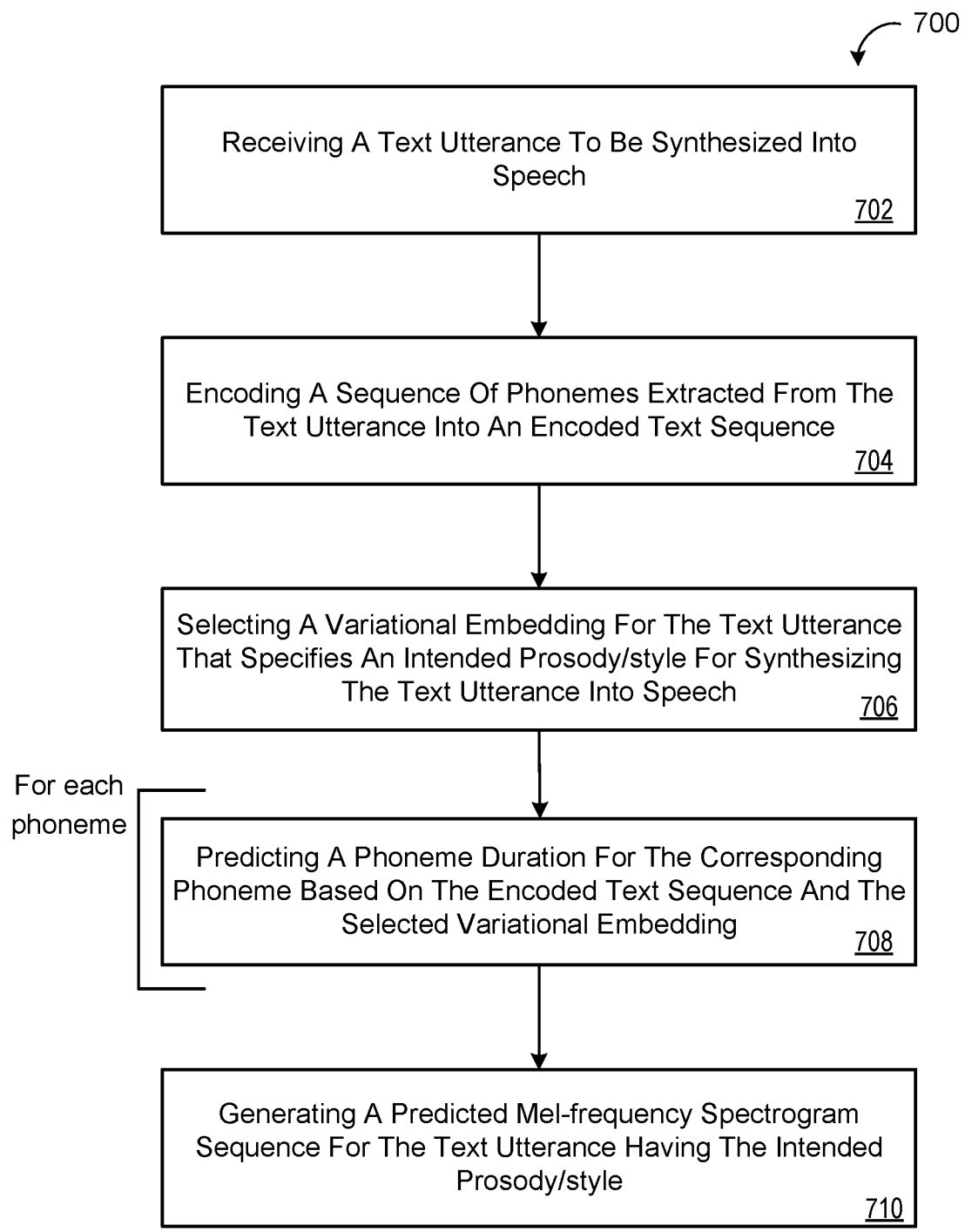
FIG. 7 is a flowchart of an exemplary arrangement of operations for a computer-implemented method for executing a trained non-autoregressive TTS model.

FIG. 7 is a flowchart of an exemplary arrangement of operations for a computer-implemented method 700 for executing a trained non-autoregressive TTS model 300. The method 700, at step 702, includes receiving a text utterance 320 to be synthesized into speech 152. The method 700, at step 704, includes encoding, using a text encoder 210 of a non-autoregressive TT S model 300, a sequence of phonemes extracted from the text utterance 320 into an encoded text sequence 219. The method 700, at step 706, includes selecting a variational embedding 220 for the text utterance 320. The variational embedding 220 specifies an intended prosody/style for synthesizing the text utterance 320 into speech 152. For each phoneme in the sequence of phonemes, the method 700, at step 708, includes predicting, using a duration decoder 230 of the non-autoregressive TTS model 300, a phoneme duration 240 for the corresponding phoneme based on the encoded text sequence 219 and the selected variational embedding 220. The method 700, at step 710, includes generating, as output from a spectrogram decoder 250 of the non-autoregressive TTS model 300 that includes a stack of self-attention blocks 252 and based on an output 238 of the duration decoder 230 and the predicted phoneme durations 240, a predicted mel-frequency spectrogram sequence 302 for the text utterance 320. The predicted mel-frequency spectrogram sequence 302 has the intended prosody/style specified by the selected variational embedding 220.

Figure 8:
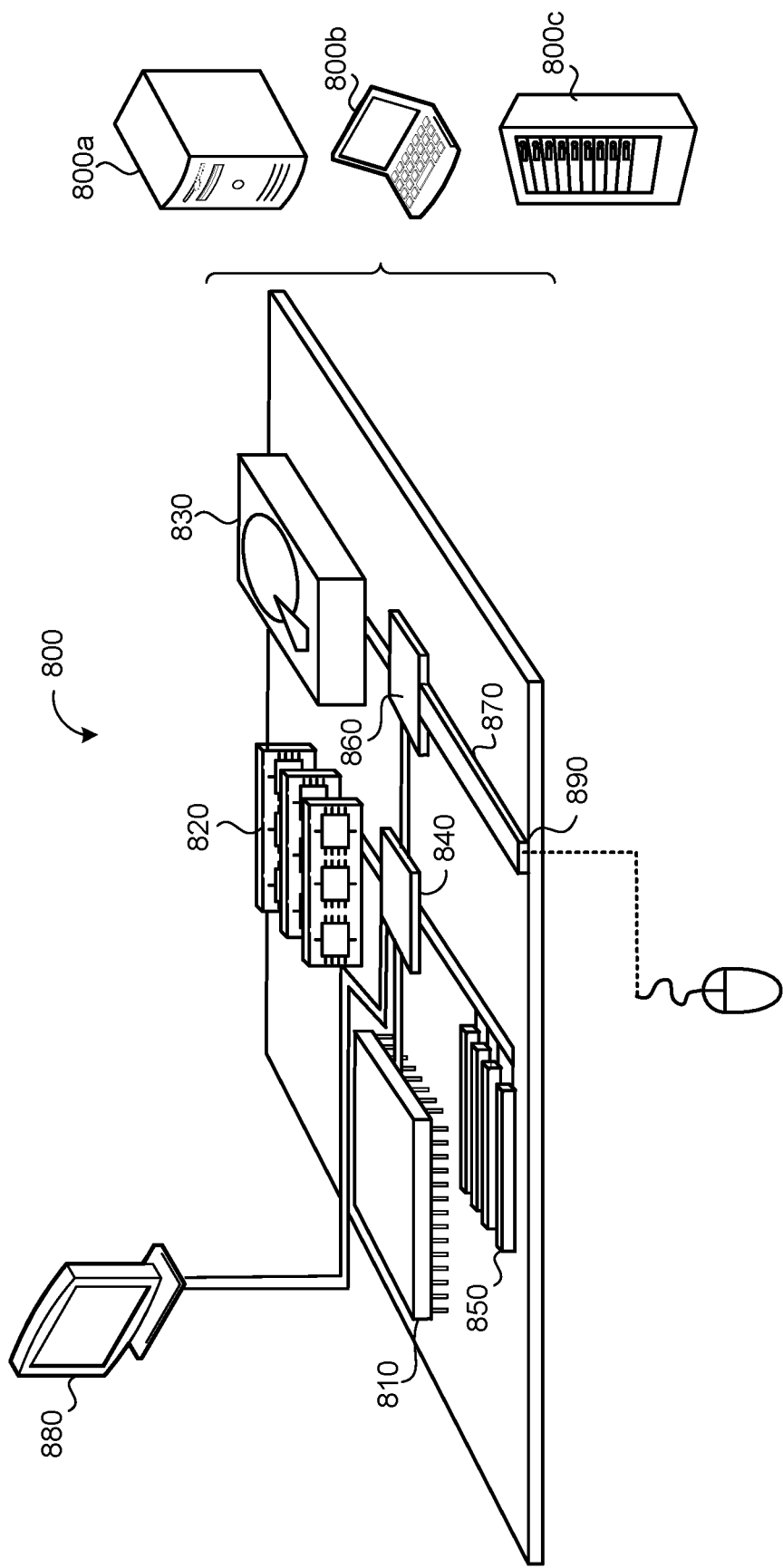
FIG. 8 is a schematic view of an example computing device that may be used to implement the systems and methods described herein.

FIG. 8 is schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor 810, memory 820, a storage device 830, a high-speed interface/controller 840 connecting to the memory 820 and high-speed expansion ports 850, and a low speed interface/controller 860 connecting to a low speed bus 870 and a storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and a low-speed expansion port 890. The low-speed expansion port 890, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800a or multiple times in a group of such servers 800a, as a laptop computer 800b, or as part of a rack server system 800c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations for training a non-autoregressive text-to-speech (TTS) model, the operations comprising:
   receiving training data including a reference audio signal and a corresponding input text sequence, the reference audio signal comprising a spoken utterance and the input text sequence corresponds to a transcript of the reference audio signal;
   encoding, using a residual encoder, the reference audio signal into a variational embedding, the variational embedding disentangling style/prosody information from the reference audio signal;
   encoding, using a text encoder, the input text sequence into an encoded text sequence;
   predicting, using a duration decoder comprising a stack of self-attention blocks followed by two independent projections, based on the encoded text sequence and the variational embedding, a phoneme duration for each phoneme in the input text sequence by:
      predicting, using a sigmoid activation following a first one of the two independent projections, a probability of non-zero duration for each phoneme;
      predicting, using a softplus activation following a second one of the two independent projections, the phoneme duration for each phoneme;
      determining whether the probability of non-zero duration predicted for the corresponding phoneme is less than a threshold value; and
      when the probability of non-zero duration is less than the threshold value, zeroing out the phoneme duration predicted for the corresponding phoneme;
   determining a phoneme duration loss based on the predicted phoneme durations and a reference phoneme duration sampled from the reference audio signal for each phoneme in the input text sequence
   generating, as output from a non-autoregressive spectrogram decoder comprising a stack of self-attention blocks, based on an output of the duration decoder, multiple predicted mel-frequency spectrogram sequences for the input text sequence;
   determining a final spectrogram loss based on the multiple predicted mel-frequency spectrogram sequences and a reference mel-frequency spectrogram sequence sampled from the reference audio signal; and
   training the TTS model based on the final spectrogram loss and the corresponding phoneme duration loss determined for each phoneme in the input text sequence.

2. The computer-implemented method of claim 1, wherein each self-attention block in the stack of self-attention blocks comprises an identical lightweight convolution (LConv) block.

3. The computer-implemented method of claim 1, wherein each self-attention block in the stack of self-attention blocks comprises an identical transformer block.

4. The computer-implemented method of claim 1, wherein the input text sequence comprises words each having one or more phonemes, silences at all word boundaries, and punctuation marks.

5. The computer-implemented method of claim 1, wherein:
   the residual encoder comprises a global variational autoencoder (VAE); and
   encoding the reference audio signal into the variational embedding comprises:
      sampling the reference mel-frequency spectrogram sequence from the reference audio signal; and
      encoding, using the global VAE, the reference mel-frequency spectrogram sequence into the variational embedding.

6. The computer-implemented method of claim 1, wherein:
   the residual encoder comprises a phoneme-level fine-grained variational autoencoder (VAE); and
   encoding the reference audio signal into the variational embedding comprises:
      sampling the reference mel-frequency spectrogram sequence from the reference audio signal;
      aligning the reference mel-frequency spectrogram sequence with each phoneme in a sequence of phonemes extracted from the input text sequence; and
      encoding, using the phoneme-level fine-grained VAE, based on aligning the reference mel-frequency spectrogram sequence with each phoneme in the sequence of phonemes, a sequence of phoneme-level variational embeddings.

7. The computer-implemented method of claim 1, wherein the residual encoder comprises a stack of lightweight convolution (LConv) blocks, each LConv block in the stack of LConv blocks comprises:
 a gated linear unit (GLU) layer;
 a LConv layer configured to receive an output of the GLU layer;
 a residual connection configured to concatenate an output of the LConv layer with an input to the GLU layer; and
 a final feedforward layer configured to receive, as input, the residual connection concatenating the output of the LConv layer with the input to the GLU layer.

8. The computer-implemented method of claim 1, wherein the operations further comprise:
 upsampling, using the reference phoneme duration sampled from the reference audio signal for each phoneme in the input text sequence, the output of the duration decoder into a number of frames; and
 obtaining positional embeddings representing phoneme position information for each phoneme in the input text utterance,
 wherein generating the multiple predicted mel-frequency spectrogram sequences for the input text sequence is based on the positional embeddings and the upsampling of the output of the duration decoder into the number of frames.

9. The computer-implemented method of claim 1, wherein:
 generating the multiple predicted mel-frequency spectrogram sequences for the input text sequence comprises generating, as output from each self-attention block in the stack of self-attention blocks of the spectrogram decoder, a respective mel-frequency spectrogram sequence; and
 determining the final spectrogram loss comprises:
  for each respective predicted mel-frequency spectrogram sequence, determining a respective spectrogram loss based on the predicted mel-frequency spectrogram sequence and the reference mel-frequency spectrogram sequence; and
  aggregating the respective spectrogram losses determined for the predicted mel-frequency spectrogram sequences to generate the final spectrogram loss.

10. The computer-implemented method of claim 1, wherein the operations further comprise:
 concatenating the encoded text sequence, the variational embedding, and a reference speaker embedding representing an identity of a reference speaker that uttered the reference audio signal; and
 generating the output of the duration decoder based on the duration decoder receiving, as input, the concatenation of the encoded text sequence, the variational embedding, and the reference speaker embedding.

11. The computer-implemented method of claim 1, wherein:
 the input text sequence includes a sequence of phonemes; and
 encoding the input text sequence into the encoded text sequence comprises:
  receiving, from a phoneme look-up table, a respective embedding of each phoneme in the sequence of phonemes;
  for each phoneme in the sequence of phonemes, processing, using an encoder pre-net neural network of the text encoder, the respective embedding to generate a respective transformed embedding of the phoneme;
  processing, using a bank of convolutional blocks, the respective transformed embeddings to generate convolution outputs; and
  processing, using a stack of self-attention blocks, the convolution outputs to generate the encoded text sequence.

12. A system for training a non-autoregressive text-to-speech (TTS) model, the system comprising:
 data processing hardware; and
 memory hardware in communication with the data processing hardware, the memory hardware storing instructions that when executed by the data processing hardware cause the data processing hardware to perform operations comprising:
  receiving training data including a reference audio signal and a corresponding input text sequence, the reference audio signal comprising a spoken utterance and the input text sequence corresponds to a transcript of the reference audio signal;
  encoding, using a residual encoder, the reference audio signal into a variational embedding, the variational embedding disentangling style/prosody information from the reference audio signal;
  encoding, using a text encoder, the input text sequence into an encoded text sequence;
  predicting, using a duration decoder comprising a stack of self-attention blocks followed by two independent projections, based on the encoded text sequence and the variational embedding, a phoneme duration for each phoneme in the input text sequence by:
   predicting, using a sigmoid activation following a first one of the two independent projections, a probability of non-zero duration for each phoneme;
   predicting, using a softplus activation following a second one of the two independent projections, the phoneme duration for each phoneme;
   determining whether the probability of non-zero duration predicted for the corresponding phoneme is less than a threshold value; and
   when the probability of non-zero duration is less than the threshold value, zeroing out the phoneme duration predicted for the corresponding phoneme;
  determining a phoneme duration loss based on the predicted phoneme durations and a reference phoneme duration sampled from the reference audio signal for each phoneme in the input text sequence
  generating, as output from a non-autoregressive spectrogram decoder comprising a stack of self-attention blocks, based on an output of the duration decoder, multiple predicted mel-frequency spectrogram sequences for the input text sequence;
  determining a final spectrogram loss based on the multiple predicted mel-frequency spectrogram sequences and a reference mel-frequency spectrogram sequence sampled from the reference audio signal; and
  training the TTS model based on the final spectrogram loss and the corresponding phoneme duration loss determined for each phoneme in the input text sequence.

13. The system of claim 12, wherein each self-attention block in the stack of self-attention blocks comprises an identical lightweight convolution (LConv) block.

14. The system of claim 12, wherein each self-attention block in the stack of self-attention blocks comprises an identical transformer block.

15. The system of claim 12, wherein the input text sequence comprises words each having one or more phonemes, silences at all word boundaries, and punctuation marks.

16. The system of claim 12, wherein:
the residual encoder comprises a global variational autoencoder (VAE); and
encoding the reference audio signal into the variational embedding comprises:
sampling the reference mel-frequency spectrogram sequence from the reference audio signal; and
encoding, using the global VAE, the reference mel-frequency spectrogram sequence into the variational embedding.

17. The system of claim 12, wherein:
the residual encoder comprises a phoneme-level fine-grained variational autoencoder (VAE); and
encoding the reference audio signal into the variational embedding comprises:
sampling the reference mel-frequency spectrogram sequence from the reference audio signal;
aligning the reference mel-frequency spectrogram sequence with each phoneme in a sequence of phonemes extracted from the input text sequence; and
encoding, using the phoneme-level fine-grained VAE, based on aligning the reference mel-frequency spectrogram sequence with each phoneme in the sequence of phonemes, a sequence of phoneme-level variational embeddings.

18. The system of claim 12, wherein the residual encoder comprises a stack of lightweight convolution (LConv) blocks, each LConv block in the stack of LConv blocks comprises:
a gated linear unit (GLU) layer;
a LConv layer configured to receive an output of the GLU layer;
a residual connection configured to concatenate an output of the LConv layer with an input to the GLU layer; and
a final feedforward layer configured to receive, as input, the residual connection concatenating the output of the LConv layer with the input to the GLU layer.

19. The system of claim 12, wherein the operations further comprise:
upsampling, using the reference phoneme duration sampled from the reference audio signal for each phoneme in the input text sequence, the output of the duration decoder into a number of frames; and
obtaining positional embeddings representing phoneme position information for each phoneme in the input text utterance,
wherein generating the multiple predicted mel-frequency spectrogram sequences for the input text sequence is based on the positional embeddings and the upsampling of the output of the duration decoder into the number of frames.

20. The system of claim 12, wherein:
generating the multiple predicted mel-frequency spectrogram sequences for the input text sequence comprises generating, as output from each self-attention block in the stack of self-attention blocks of the spectrogram decoder, a respective mel-frequency spectrogram sequence; and
determining the final spectrogram loss comprises:
for each respective predicted mel-frequency spectrogram sequence, determining a respective spectrogram loss based on the predicted mel-frequency spectrogram sequence and the reference mel-frequency spectrogram sequence; and
aggregating the respective spectrogram losses determined for the predicted mel-frequency spectrogram sequences to generate the final spectrogram loss.

21. The system of claim 12, wherein the operations further comprise:
concatenating the encoded text sequence, the variational embedding, and a reference speaker embedding representing an identity of a reference speaker that uttered the reference audio signal; and
generating the output of the duration decoder based on the duration decoder receiving, as input, the concatenation of the encoded text sequence, the variational embedding, and the reference speaker embedding.

22. The system of claim 12, wherein:
the input text sequence includes a sequence of phonemes; and
encoding the input text sequence into the encoded text sequence comprises:
receiving, from a phoneme look-up table, a respective embedding of each phoneme in the sequence of phonemes;
for each phoneme in the sequence of phonemes, processing, using an encoder pre-net neural network of the text encoder, the respective embedding to generate a respective transformed embedding of the phoneme;
processing, using a bank of convolutional blocks, the respective transformed embeddings to generate convolution outputs; and
processing, using a stack of self-attention blocks, the convolution outputs to generate the encoded text sequence.

* * * * *